US005128617A

United States Patent [19]

Bills

[11] Patent Number: 5,128,617

[45] Date of Patent: Jul. 7, 1992

[54] IONIZATION VACUUM GAUGE WITH EMISSION OF ELECTRONS IN PARALLEL PATHS

[75] Inventor: Daniel G. Bills, Boulder, Colo.

[73] Assignee: Granville-Phillips Company, Boulder, Colo.

[21] Appl. No.: 507,579

[22] Filed: Apr. 11, 1990

[51] Int. Cl.[5] .................... G01L 21/32; H05H 15/00

[52] U.S. Cl. .................................. 324/459; 324/462; 313/363.1

[58] Field of Search ............... 324/459, 462, 463, 451, 324/464, 468, 470; 313/363.1; 315/111.91; 250/427

[56] References Cited

U.S. PATENT DOCUMENTS

| | | | |
|---|---|---|---|
| 3,495,127 | 2/1970 | Lafferty | 324/462 X |
| 3,743,876 | 7/1973 | Redhead | 324/462 X |
| 3,839,655 | 10/1974 | Helgeland et al. | 324/462 X |
| 4,093,913 | 6/1978 | O'Neal, III | 324/462 |
| 4,636,680 | 1/1987 | Bills et al. | |
| 4,714,891 | 12/1987 | Morrison, Jr. | |

FOREIGN PATENT DOCUMENTS 59-102755 9/1965 Japan .

OTHER PUBLICATIONS

K. E. McCulloh & C. R. Tilford, J. Vac. Sci. Technol. 18 994 (1981).

L. G. Pittaway, J. Phys. D. Appl. Phys. 3 1113 (1970).

K. F. Poulter et al., J. Vac. Sci. Technol. 17 679 (1980).

West German Patent DE 3042 172A1.

K. F. Poulter et al., Vac/Vol. 31, No. 3, pp. 147-150 (1981).

Paul Redhead et al., "Physical Basis of Ultra-High Vacuum", (1968) pp. 234-239.

*Primary Examiner*—Gerard R. Strecker
*Assistant Examiner*—Maura K. Regan
*Attorney, Agent, or Firm*—Sixbey, Friedman, Leedom & Ferguson

[57] ABSTRACT

An ionization gauge and controller therefor where the gauge has a sensitivity which is reproducible gauge to gauge and stable over time in the same gauge. An ionization gauge with a very much lower and a somewhat higher pressure limit than prior art gauges is also disclosed. Elements are also described for launching all electrons in a tight beam in Bayard-Alpert type geometry, so that all the conditions for reproducible and stable sensitivity are satisfied. Elements are also described for collecting all electrons at low energy so that soft X-ray production is negligible.

101 Claims, 11 Drawing Sheets

IONIZATION VACUUM GAUGE WITH EMISSION OF ELECTRONS IN PARALLEL PATHS

BACKGROUND OF THE INVENTION

The present invention relates to vacuum gauges and more particularly to ionization gauges for use over a wide pressure range.

Ionization gauges typically comprise a source of electrons (cathode), an accelerating electrode (anode) to provide energetic electrons, a collecting electrode (collector) to collect the ions formed by electrons impacting on gas molecules within the gauge and an envelope or outer electrode surrounding the other electrodes. Ideally the number of positive ions collected within the gauge is directly proportional to the molecular gas density within the gauge. However, in prior art gauges there are numerous factors which cause the number of positive ions collected not to be strictly proportional to the density. Also, the production of undesirable extraneous currents in the gauge, which are independent of gas pressure, tend to present a practical barrier to measurement of very low pressure. Build-up of positive ion space charge at higher pressures leads to loss of ions collected by the ion collector which tends to set an upper limit on the pressure which can be measured.

The primary reason that ion current collected is not proportional to gas density in prior art gauges is that the number of ions produced per electron emitted is not constant at any given pressure. The prior art gauges have not caused emitted electrons to produce a proportional number of ions at any given pressure.

Extraneous currents principally result from a so-called X-ray effect. Bombardment of the anode by electrons produces soft X-rays. Some soft X-rays impinge on the collector, thereby producing a photo-electron current which adds to the ion current in the collector. The photo-electron current and the ion current are not distinguishable from one another in the ion current measuring circuit. Thus, the photo-electron current establishes a lowest practical limit beyond which meaningful ion current measurement cannot be made.

Vacuum gauges are known which have reduced the X-ray effect by several orders of magnitude and with special precautions still lower. One such gauge, commonly referred to as the "Bayard-Alpert (BA) gauge", is disclosed in U.S. Pat. No. 2,605,431. See also U.S. Pat. Nos. 4,636,680 and 4,714,891 assigned to the assignee of the present application. All of the foregoing U.S. Patents are incorporated herein by reference. The BA ionization gauge is widely used. However, because low pressure gauge calibration is a very expensive and time-consuming procedure, most BA gauges are used as manufactured, and are typically not subjected to calibration before use. Thus, it is highly desirable that the gauge sensitivity be reproducible gauge to gauge and stable from measurement to measurement in the same gauge.

Unfortunately, the sensitivity of commercially available BA gauges tends to be neither reproducible, nor stable. It has been found that typical commercially available BA gauges exhibit substantial differences in sensitivity from gauge to gauge. See K. E. McCulloh and C. R. Tilford, *J. Vac. Sci. Technol.* 18 994 (1981). Further, it has been noted that the sensitivity of typical BA gauges tends to drift by, for example, as much as 1.4% per 100 operating hours when kept at vacuum. Moreover, changes in sensitivity of up to 25% occur when the gauge is briefly exposed to the atmosphere and then operated in vacuum. See K. F. Poulter and C. J. Sutton, *Vacuum* 31 145 (1981).

For repeatable and stable sensitivity at a given emission current and over a given pressure range, it has been determined that:

1. The fraction of the electron emission current which is effective at producing ions remains constant over time and from gauge to gauge.
2. The instantaneous ionizing energy of electrons of corresponding distances in their trajectories is constant over time and from gauge to gauge.
3. The total electron path in the ion collection volume within the anode is constant over time and from gauge to gauge.
4. The ion collection efficiency is constant over time and from gauge to gauge.

These fundamental requirements are not well-satisfied in most prior art BA gauges. Although many of these requirements are considered in above-mentioned U.S. Pat. Nos. 4,636,680 and 4,714,891, the ion gauges of the present invention constitute improvements with respect to the gauges disclosed in these patents.

In a typical BA gauge, the electric field varies from place to place in the gauge. Accordingly, the ionizing energy that an electron acquires depends both upon the particular trajectory of the electron and the instantaneous position of the electron along the trajectory. Electron paths vary greatly depending on where on the cathode and in which direction the electron is emitted. See, for example, L. G. Pittaway, *J. Phys. D. Appl. Phys.* 3 1113 (1970).

Attempts have been made to control the divergence of the emitted electron stream from the cathode to anode. For example, a special electrode has been placed behind the cathode for this purpose. Such a gauge is described in U.S. Pat. No. 3,743,876 issued to P. A. Redhead, which patent is also incorporated herein by reference.

Computer stimulation of electron trajectories using Redhead's design shows some improvement in focusing more of the electrons into the anode volume but there still exists a huge diversity of electron trajectories mainly because many electrons are launched tangentially.

Ionization gauges have been made which exhibit sensitivities which are reproducible and stable to better than ±2% over an 18-month period. However, these transducers are elaborate, complex and costly devices not suited for general use and are incapable of measuring very low pressures. See K. F. Poulter et al, *J. Vac. Sci. Technol.* 17 679 (1980).

Determining the actual trajectories of individual electrons or ions in any given electrode geometry is a difficult task at best. Thus, resort is typically made to computer simulations of the potential gradients which exist in a given electrode geometry and compute the expected trajectory of a charged particle based on the known physical properties of the charged particle. Such techniques of computer modeling or simulation of charged particle trajectories are well-known in the art. In the present invention, applicant used a sophisticated program to provide the charged particle trajectories described and shown hereinafter. This program was funded by the U.S. Department of Energy. All of the trajectory results shown hereinafter may readily be duplicated by modeling the same electrode geometries and electrode potentials to the same accuracy with this or any comparable program.

Applicant has found using computer modeling that four distinct prior art modes of controlling electron trajectories can be distinguished. Each mode produces a great variety of electron trajectories in B-A geometry:

1. Electrons are emitted from the cathode in many different directions. This is the situation in the widely used B-A gauge where computer modeling shows that prior art cathode-anode geometries cause most electrons to acquire substantial tangential components of velocity. Thus, many different shaped electron trajectories exist.
2. Electrons are emitted in all directions and then redirected generally toward the anode as in Redhead's U.S. Pat. No. 3,743,876. This is an improvement on the B-A gauge but still results in a great variety of trajectory shapes.
3. Electrons are emitted from the cathode and then focused through an entrance slot in the anode by suitable focusing electrodes. This is the arrangement used in above-mentioned U.S. Pat. No. 4,636,680 of which applicant is a co-inventor. Computer modeling shows that the electron stream converges on a narrow slot in the anode. Once inside the anode volume, the electron stream diverges producing a great variety of electron trajectories.
4. Electrons are launched from a narrow strip cathode in parallel paths directly at the ion collector located on the axis of symmetry of the anode. Computer modeling shows that this method of launching electrons produces a wide variety of electron trajectories.

OBJECTIVES OF THE PRESENT INVENTION

One objective of the present invention is to provide a Bayard-Alpert type ionization gauge with a reproducible and stable sensitivity by causing all electrons to have the same shape trajectories.

Another objective is to provide an ionization gauge with a very low pressure limit by eliminating or reducing the production of soft X-rays by causing all electrons to be collected at low energy.

Another objective is to provide an ionization gauge with a very high as well as a very low pressure limit by collecting ions with large angular momenta on a large diameter ion collector in the absence of soft X-rays.

Another objective is to provide an ionization gauge with a reproducible and stable sensitivity by creating ions in a cylindrically symmetric field in one-half of the anode volume and disturbing the cylindrical symmetry of the ion collection field in the other half of the anode volume so as to reduce space charge caused by ion orbiting.

These and other objectives of the invention will become apparent from a reading of the following description of the invention taken with the figures of the drawing and claims.

DETAILED DESCRIPTION OF THE INVENTION

Figure 1:
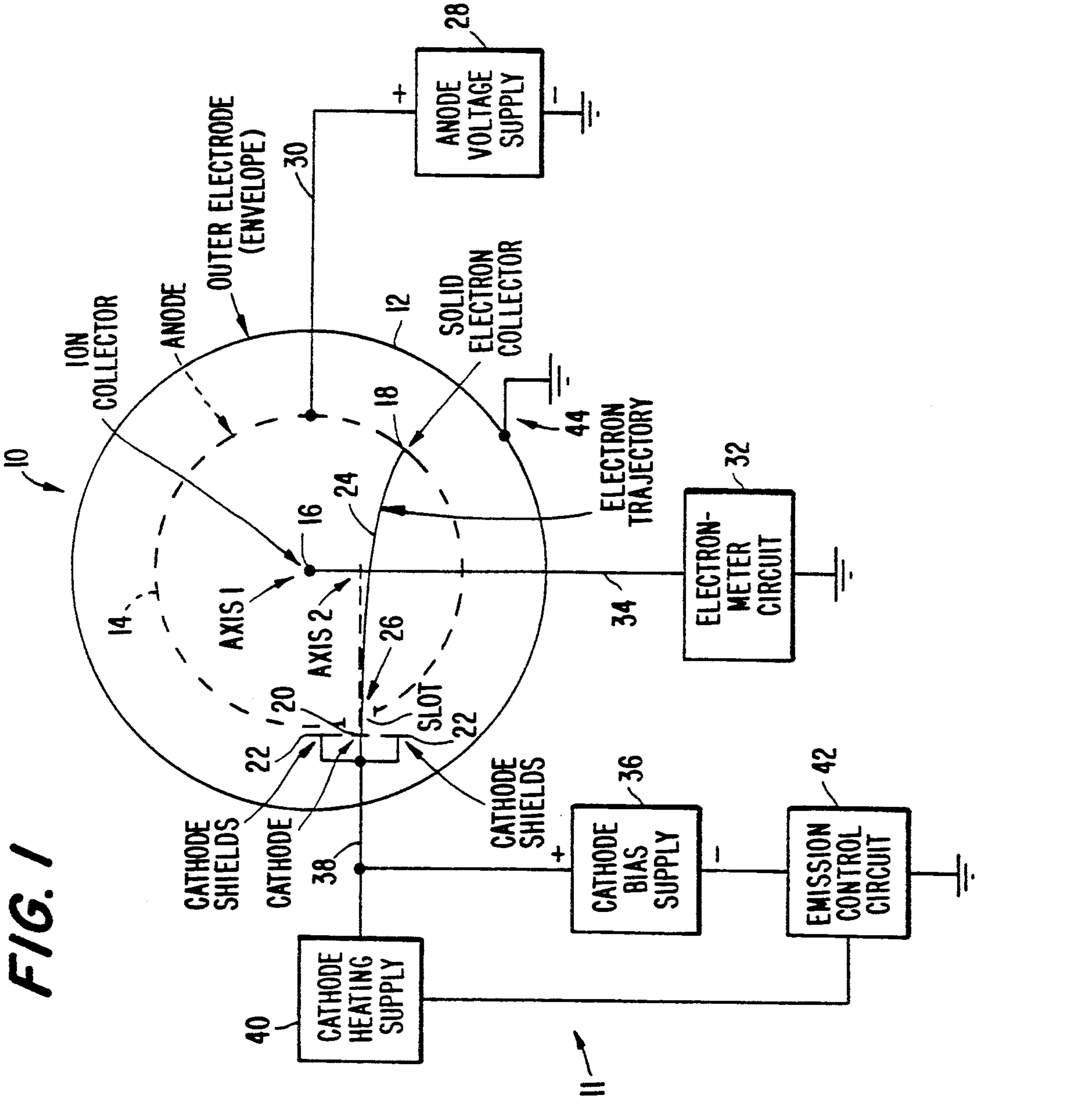
FIG. 1 is a schematic diagram of an illustrative gauge and illustrative controller circuitry therefor in accordance with the present invention.

Reference is made to the drawing where like reference numerals refer to like parts.

An important first feature of the invention relates to launching of electrons in a BA geometry. Referring to FIG. 1, there is shown a top view of an illustrative gauge 10 and controller circuitry 11 therefor where the gauge includes an electrically conductive, outer electrode or envelope 12 and an anode 14 where the envelope and anode are preferably cylindrically symmetric. An ion collector 16 is preferably disposed at the axis of cylindrical symmetry (axis 1) of anode 14.

The anode is preferably an open grid as indicated by the dotted lines in FIG. 1, such open grid anodes being conventional in BA ion gauges as exemplified by above-mentioned U.S. Pat. Nos. 3,743,826 and 4,714,891. In accordance with an important feature of the invention a solid electron collector 18 is disposed on the anode in electrical contact therewith. The electron collector is so disposed on the anode circumference as to collect ionizing electrons which pass through the anode volume defined by the interior space within the anode.

A cathode 20 having cathode shields 22 disposed on opposite sides thereof and in electrical contact therewith preferably comprises a generally vertically extending ribbon having a flat emitting surface of a known type. The orientation of the flat emitting surface is such as to launch electrons toward an imaginary axis (axis 2) which is separated from and parallel to axis 1 to thus provide an electron trajectory 24 from cathode 20 to electron collector 18 where an entrance slot 26 is preferably provided in anode 14 to facilitate passage of electrons into the anode volume.

Controller circuitry 11 includes the circuit elements for providing preferred potentials to the electrodes of gauge 10, for measuring the ion current, and for providing the other electric currents and voltages needed for operation of the gauge. In particular, controller 11 includes an anode voltage supply 28 connected to anode 14 via line 30, an electrometer circuit 32 connected to ion collector 16 via line 34, and a cathode bias supply 36 connected to cathode 20 and shields 22 via line 38. A cathode heating supply 40 for providing a heating current, preferably DC, to the cathode and a known emission control circuit 42 are also preferably provided. Moreover, outer electrode 12 is preferably grounded as indicated at 44.

In general, what applicant has done is to create the required conditions for reproducible and stable sensitivity in Bayard-Alpert type geometry such as that of FIG. 1. In particular, applicant has found that when the electrons are launched via an appropriate electric field, not at the axis of symmetry (axis 1) on which is located the ion collector, but substantially at an imaginary axis (axis 2) displaced radially from axis 1, all electron trajectories are identical. The direction of launching is preferably perpendicular to the line between axis 1 and axis 2. In order to launch electrons at axis 2, the electric field in front of the cathode should be directed substantially at axis 2. The perpendicular to the emitting surface of the cathode should preferably pass through axis 2. The cathode should be biased at local potential or just slightly positive with respect to local potential in the vicinity of the cathode. With respect to the term "local potential", note that a potential gradient exists between the anode and outer electrode such that at a particular position between the anode and outer electrode a particular potential will exist, the value of which is intermediate the values of the anode and outer electrode potentials. If the cathode is positioned at the foregoing particular position, it will be biased at local potential if it is biased at the foregoing intermediate potential value.

The potential difference between the anode and cathode must be sufficiently high to provide appropriate ionizing energy for electrons as is well-known in the art. The electric field in front of the cathode must be sufficiently high to prevent space charge limitation of emissions but the ends and back of the cathode must be space charge limited. The electric field in front of the cathode must be high enough to cause electrons emitted in random directions to be quickly deflected toward axis 2. Axis 2 is preferably displaced from axis 1 by at least 5% of the radius of the anode. The minimum useful displacement of axis 2 with respect to axis 1 is about 0.005". The maximum useful displacement is about 50% of the anode radius.

Cathode width (in the vertical direction in the plane of FIG. 1) preferably is not more than about 5% of the radius of the anode for best results. The minimum cathode width may be made as small as practical subject to the condition that the required electron emission can be obtained from the front surface where such required electron emission will be further discussed below. The maximum cathode width may be about 20% of the anode radius and is limited by the width required for the entrance slot in the anode. As the slot width increases, the electric field may be severely deformed and the requisite parallel trajectories discussed below may be disturbed. The maximum cathode width using a grid anode may be about 40% of the anode radius before the electron trajectories become severely disturbed.

Entrance slot 26 in the anode can be positioned to admit all of the emitted electrons into the anode volume, or the electrons can be accelerated through the grid structure of the anode into the anode volume with some loss of electrons to the grid. One or two cathode shields 22 biased substantially at cathode potential and parallel to the cathode emitting surface may be used to help launch electrons correctly. One or two anode shields 46 (see FIG. 6) placed parallel to the emitting surface of the cathode may also be used to shape the electric field between cathode and anode so that electrons are launched correctly at axis 2.

The operation of the invention is illustrated in FIGS. 2-6 by computer simulations of the potential gradients which exist in given electrode geometries with given potentials existing at the electrodes where the electrodes themselves are only generally indicated due to the nature of the computer simulation.

Figure 2:
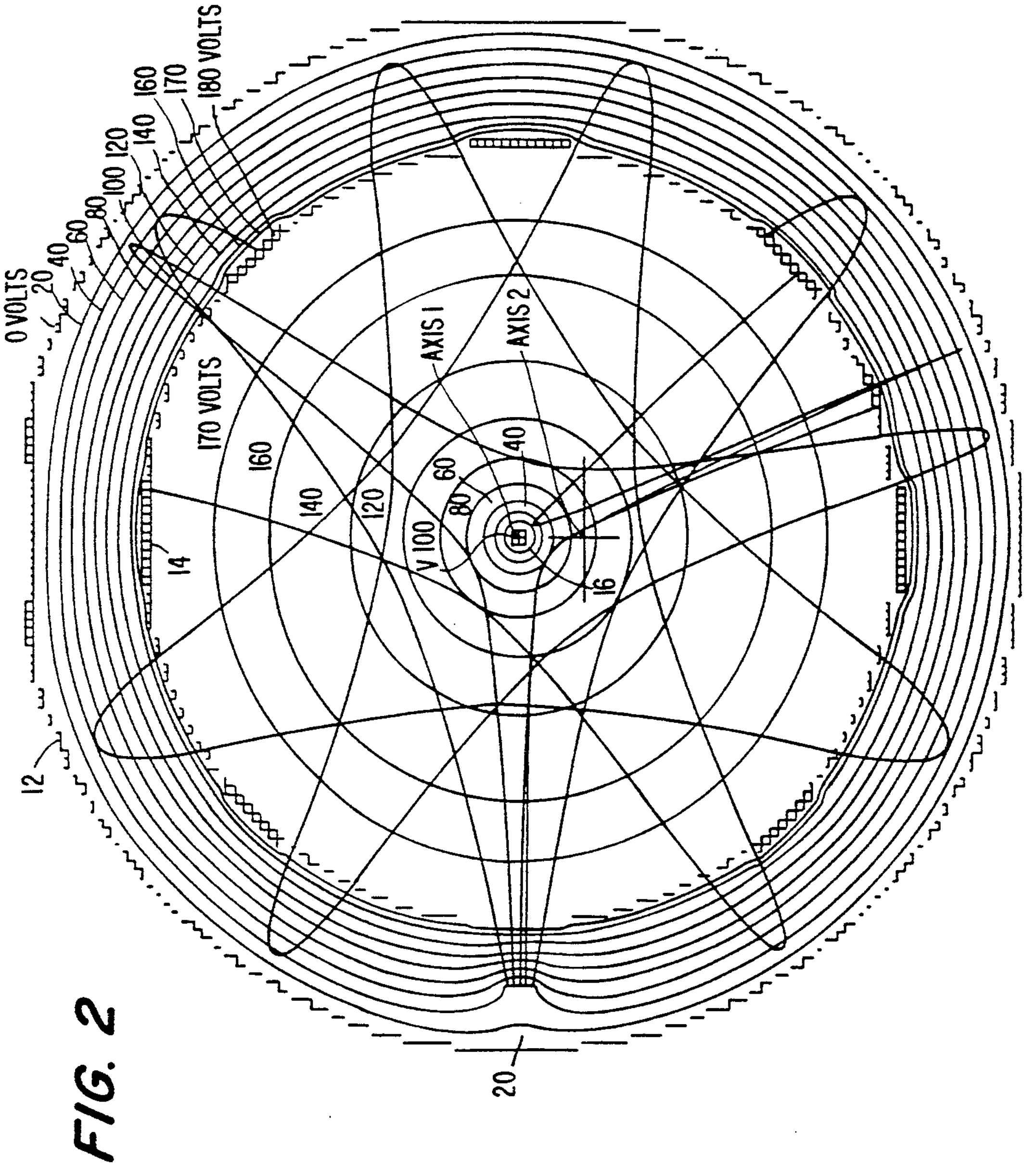
FIG. 2 is a computer simulation of the potential gradients which exist in an electrode geometry corresponding to a gauge where, in accordance with the prior art, electrons are launched at an ion collector disposed at the center of cylindrical symmetry of the anode.
Figure 3:
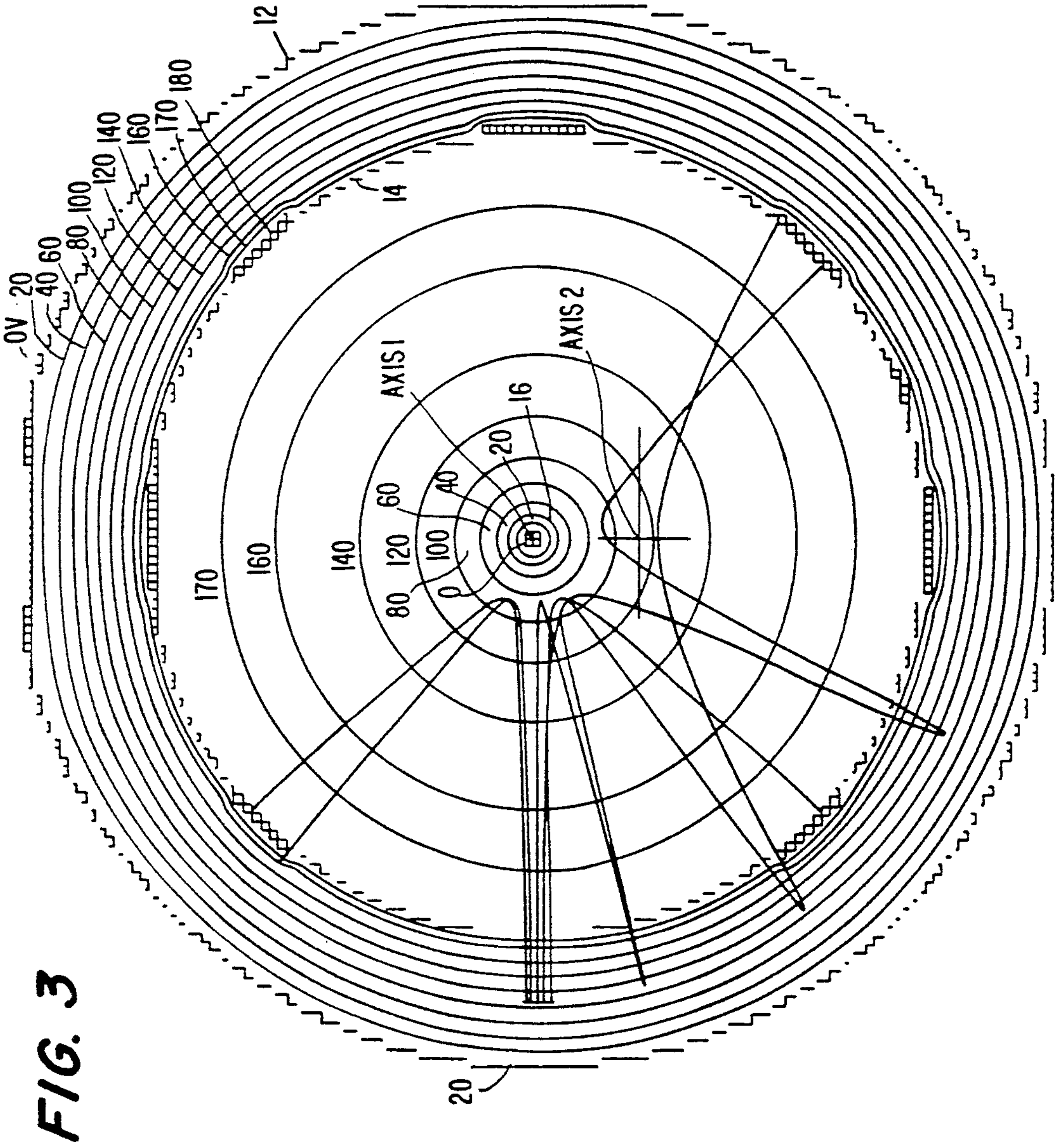
FIG. 3 is a computer simulation corresponding to that of FIG. 2 except the cathode is biased at local potential.

FIG. 2 shows five typical electron trajectories for electrons launched substantially directly at axis 1 using prior art electrode potentials. The electron paths are widely divergent because electrons are not launched toward axis 2. FIG. 3 shows five typical electron trajectories for electrons launched substantially directly at axis 1 with the cathode biased at the local potential in the vicinity of the cathode. The paths are widely divergent. FIGS. 2 and 3 show that launching electrons substantially directly at the ion collector located on axis 1 causes the electron paths to diverge when the cathode is biased at other than local potential and/or when the cathode is biased at the local potential in the vicinity of the cathode.

Launching electrons directly at axis 1 with the ion collector on axis 1 thus causes the electron trajectories to diverge. However, the invention is also applicable to the arrangement where the ion collector is displaced from the axis of symmetry of the anode to axis 2 and the electrons are launched at axis 1 where the electrode potentials would be the same as in the arrangement where the collector is at axis 1 and the electrons are launched at axis 2 and where, in particular, the cathode is biased at local potential. In this regard, reference is made to above-mentioned U.S. Pat. No. 4,636,680 (Col. 7) which describes an ion gauge having a closed, cylindrical anode; a cathode disposed outside the anode for emitting electrons, means for focusing the electrons through an elongate opening in the anode; and an ion collector removed from the axis of anode symmetry. However, in this gauge the electrons are focused or made to converge through a narrow slit in the anode. Once inside the anode volume the electrons diverge and thus travel in diverse trajectories. Computer modeling of electron trajectories in the arrangement cited in U.S. Pat. No. 4,636,680 shows some improvement in making all trajectories the same shape over those produced in a B-A gauge. However, there is still a wide variation in path shape. Furthermore, with the ion collector removed from the axis of the anode, computer modeling shows that not all of the energetic ions produced are collected. Thus, the high pressure response is impaired because the uncollected ions produce a space charge at high pressure which seriously alters the fraction of ions collected by the ion collector.

Accordingly, an important distinguishing characteristic of the present invention over prior art is that in the present invention means are provided to launch electrons from a narrow width cathode in substantially parallel paths generally at imaginary axis 2 (in the FIG. 1 embodiment, for example) so that all of the electron trajectories are identical for all intents and purposes. When the electrons are not launched in parallel paths as when they are unfocused or when they are focused through a narrow slot, then the electron trajectories are of greatly different shape.

The original B-A gauge did not provide any focusing and, of course, the trajectories are all different. Prior art gauges such as U.S. Pat. No. 4,636,680 focus the electrons through a narrow slit but in doing so cause the electrons to converge and then diverge once inside the anode volume. This divergence results in a diversity of trajectory shapes.

In the present invention, electrons which are launched from a narrow cathode in parallel paths at imaginary axis 2 continue to travel in nearly parallel paths through the anode volume. It should be noted that in all of these arrangements there will be some slight electron space charge spreading of the beam. This small effect has not been taken into account in any of the computer simulations.

Thus, by arranging to neither focus nor unfocus the electrons, they are launched in parallel paths in accordance with the present invention. If the parallel paths are directed generally at axis 2 the best similarity of trajectories is achieved. Accordingly, this is an important feature of the present invention—that is, the "launching" of electrons in parallel paths as opposed to the "focusing or unfocusing" of the prior art In this regard, the (a) provision of flat cathodes and/or (b) placing the cathode at local potential and/or (c) the use of cathode and/or anode shields (as described below) help to establish parallel paths. Note also non flat cathodes may be used with a high electric field in front of the cathode to get all the electrons moving in parallel paths. Moreover, assuming the cathode is biased at the local potential in vicinity of the cathode, applicant has found it is possible without the use of cathode or anode shields to find a correct bias voltage for a given cathode location between outer electrode and anode where good launching is achieved but there is little room for error in positioning of the cathode or of cathode bias voltage.

Figure 4:
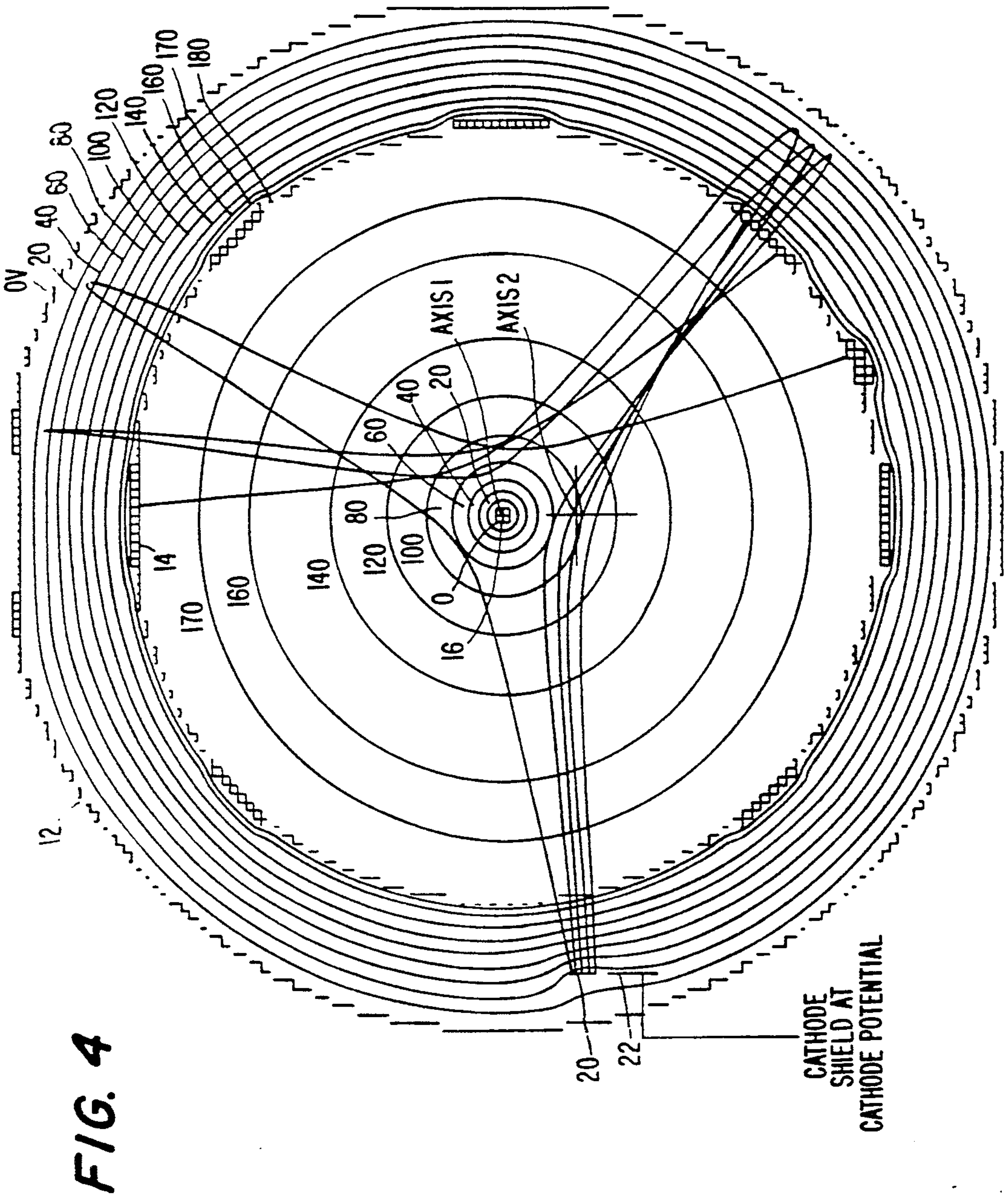
FIG. 4 is a computer simulation of the potential gradients which exist in an electrode geometry corresponding to a gauge in accordance with the present invention and with known prior art potentials applied to the electrodes thereof.

FIG. 4 shows five typical electron trajectories launched substantially directly at axis 2 with an electrode geometry in accordance with the present invention but prior art electrode potentials and with one cathode shield 22 at cathode potential. The paths are widely divergent because the launching field is distorted. The cathode bias is not the correct value. Prior art electrode potentials have been selected to satisfy the following conditions:

1. The ion collector is operated at ground potential in order to minimize leakage currents in the electrometer circuitry for measuring small ion currents.
2. The outer electrode potential is selected to be ground potential because the grounded envelope is used typically as the outer electrode. (Glass envelope gauges do not typically have an outer electrode and, therefore, have notoriously unstable sensitivities.)
3. The cathode potential is selected to be about 30 volts positive with respect to ground so that electrons will have insufficient energy to reach the ion collector.
4. The anode potential of 180 volts is then selected to accelerate electrons to about 150 eV which is, as is well-known in the art, a useful ionizing energy for gas molecules commonly found in vacuum systems.
5. In the arrangement used in U.S. Pat. No. 3,743,876 issued to Redhead, the electrode potentials have been selected to help focus electrons at the ion collector located on the axis of the anode (axis 1).

In accordance with a feature of the present invention, the cathode is located at a more convenient distance from the outer electrode, say, 0.100 inch and approximately midway between the outer electrode and anode rather than substantially adjacent the anode. With the cathode located approximately midway between the outer electrode and anode, a substantially higher cathode bias voltage is required, especially if the cathode is to be biased at local potential. However, with a cathode bias of, say, 100 volts, the electrons are accelerated to energies of only about 80 eV (180 V − 100 V) using a typical prior art anode potential of 180 volts. Rather, an anode voltage of 250 volts is required to give, say, 150 eV ionizing energy at a cathode bias of, say, 100 volts.

Figure 5:
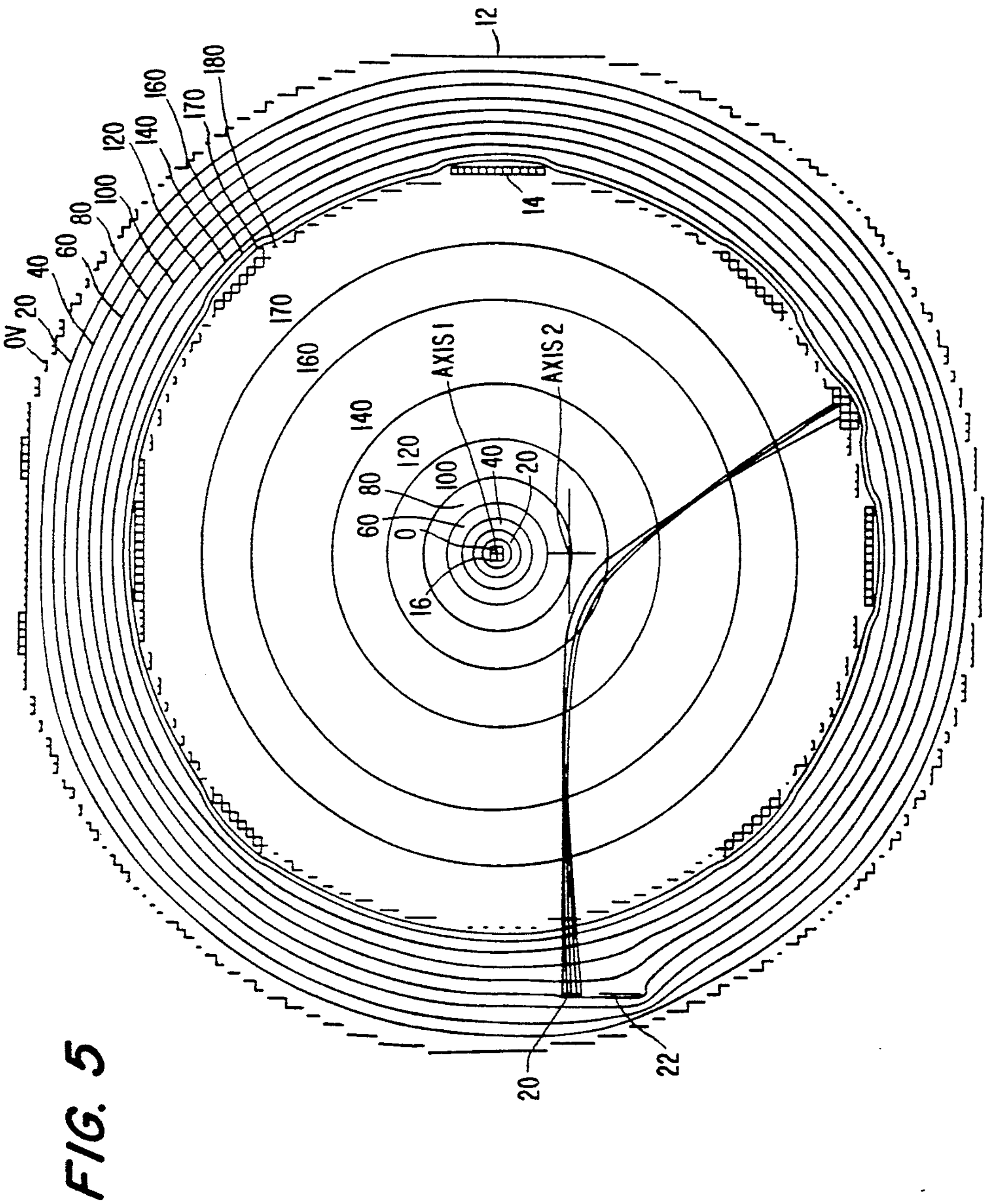
FIG. 5 is a computer simulation corresponding to that of FIG. 4 except the potential applied to the cathode is in accordance with an aspect of the present invention.

FIG. 5 shows five typical electron trajectories launched substantially directly at axis 2 with prior art electrode potentials except that the cathode 20 and cathode shield 22 are biased at the local potential of 85 V in the vicinity of the cathode. The difference in electron trajectories is startling. All of these trajectories are very nearly the same and all of the above-mentioned four conditions for reproducible and stable sensitivity are satisfied. However, the prior art anode potential of only 180 V provides only 95 eV of electron energy whereas prior art devices have typically utilized about 150 eV for electron energy. 95 eV is close to the peak in the ionization probability vs. electron energy curve for common gases in vacuum systems where ionizing probability changes rapidly with electron energy. Thus, 95 eV is not an optimum energy.

Figure 6:
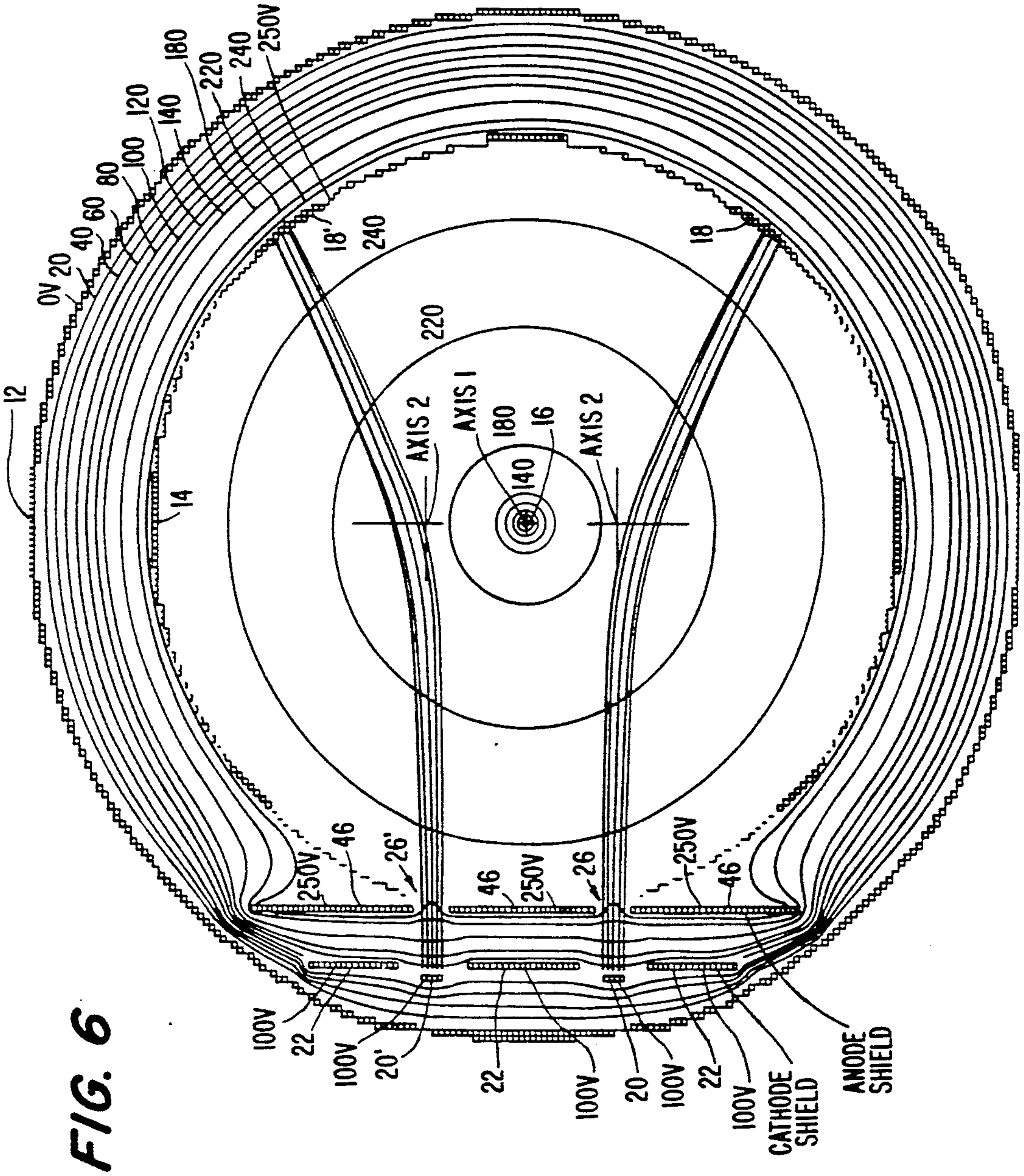
FIG. 6 is a computer simulation corresponding to that of FIG. 5 except the potential applied to the anode is in accordance with a further aspect of the invention.

FIG. 6 shows a preferred arrangement wherein all of the required conditions for a reproducible and stable ionization gauge are satisfied simultaneously and the electrons have an ionizing energy of 150 eV where the cathode potential is 100 V and the anode potential is 250 V. Here cathode 20' has been duplicated as a mirror image of cathode 20 so that two cathode filaments are available as is common in the prior art. Both cathode and anode shields are preferred for good launching where the cathode and anode shields are respectively at the potentials of the cathode and anode. Displacing the cathode slightly outward from the cathode shields, as shown in FIG. 6, aids correct launching. Known techniques may be used to support the cathode, cathode shields, and anode shields including those illustrated in above-mentioned U.S Pat. No. 4,714,891. Thus, for example, the shields may simply be spot welded in the proper position to a proper conductor—cathode support for cathode shields or anode for anode shields.

In FIG. 6 all of the emitted electrons from each cathode can be made to pass through narrow slots 26 and 26'. thus assuring condition 1 above is satisfied in that the fraction of the emission current causing ionization remains constant from gauge to gauge and over time in the same gauge. The fraction in the FIG. 6 embodiment is one. (In this computer simulation, the thin portions of the anode correspond to an open grid portion of the anode and are transparent to charged particles while providing the correct potential in these transparent regions.)

Because all of the emitted electrons from each cathode travel along almost exactly the same trajectory in the anode volume in FIG. 6, above condition 2 is met. That is, all electrons have the same ionizing energy at corresponding points in their paths and thus ionizing energy is constant from gauge to gauge and over time in the same gauge.

In FIG. 6 all of the electrons from each cathode can be collected after one pass through the anode volume on the minimum area solid electron collectors 18 and 18'. The solid electron collectors may be made part of a grid which forms the cylindrical anode 14. Thus, above condition 3 can readily be satisfied without using a closed anode volume which can cause outgassing because of the large surface area of solid anode required, as discussed hereinbefore.

In FIG. 6 positive ions are only formed along each constant electron path, thus assuring ion collection efficiency is constant from gauge to gauge and over time in the same gauge. Thus, above condition 4 is also met.

Elongated entrance slots 26, 26' in the anode can be positioned to admit all of the emitted electrons into the anode volume or the electrons can be accelerated through the grid structure of the anode into the anode volume with some loss of electrons to the grid. Solid electron collectors 18 and 18' just wide enough to intercept the beams of electrons can be made a portion of the cylindrical anode 14. The remainder of the anode is preferably an open grid.

Figure 7:
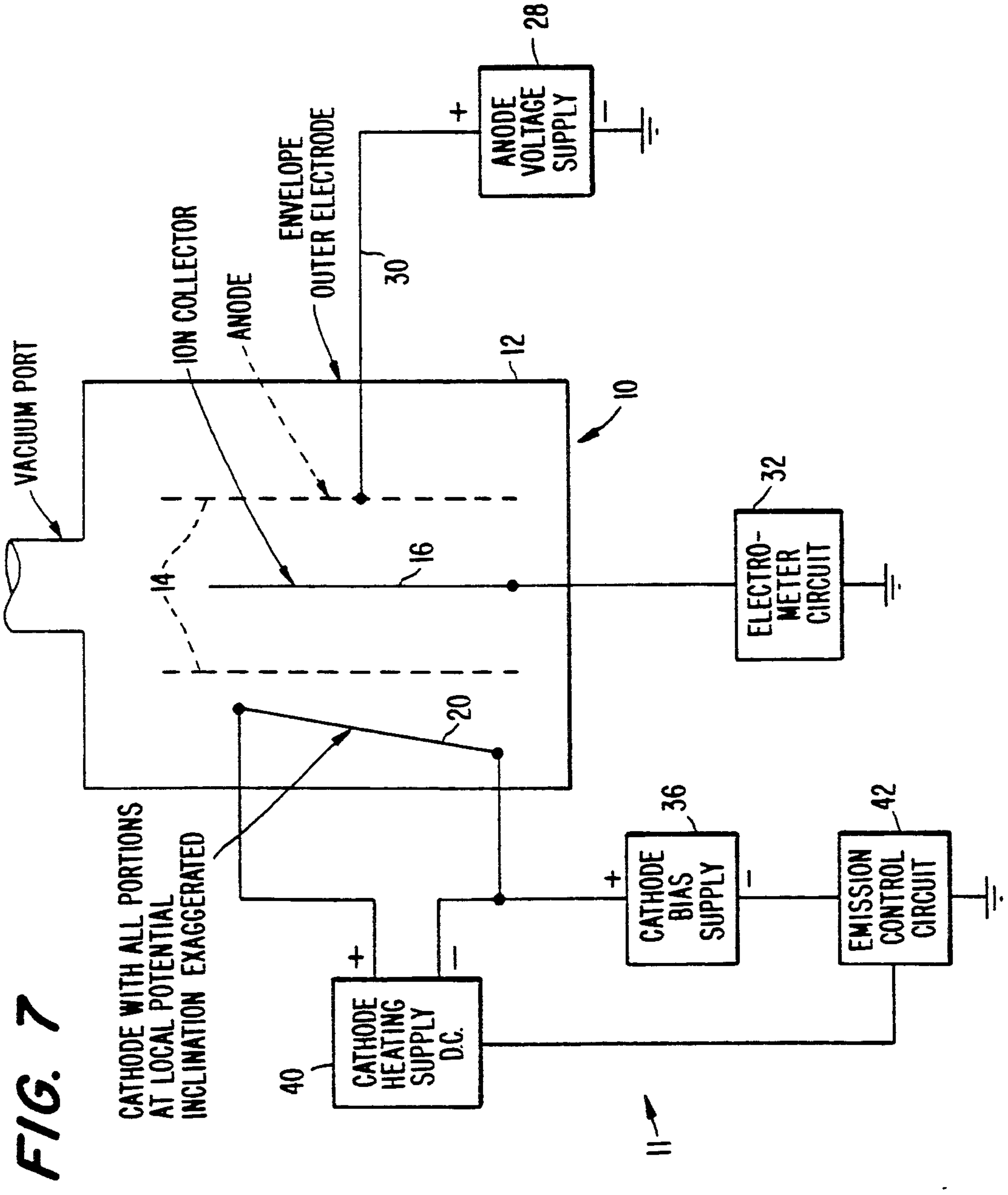
FIG. 7 is a diagrammatic cross sectional view through the axis of an improved gauge in accordance with the invention together with controller circuitry therefor where the schematically illustrated ribbon cathode is inclined so that the potential of the cathode with IR voltage drop can be positioned substantially at local potential.

Direct current from cathode heating supply 40 is preferred to heat the cathode so that the cathode potential does not vary with time. As shown in FIG. 7, when direct current is used, the cathode is preferably spaced at slightly different distances from the anode top and bottom to cause all parts of the cathode to be at local potential, even with an IR drop in the cathode. The inclination in the cathode is exaggerated for purpose of illustration.

Applicant has found a useful method of selecting electrode dimensions and potentials as follows: First, a convenient outer electrode (envelope) O.D. is selected, say, 1.5". Given a practical wall thickness, the diameter of the outer electrode is determined as the I.D. of the envelope. A convenient minimum distance between the cathode and outer electrode is selected, say, 0.100" for the location of the cathode. The anode diameter is then selected so that the cathode is positioned approximately midway between the outer electrode and the anode. The ion collector 16 is located on the axis of symmetry (axis 1) and may be made about 0.010" diameter as is well-known in the art. The outer electrode is to be connected to the vacuum system ground (0 V) via metal to metal vacuum connections as is well-known in the art. The ion collector is maintained at 0 V as is well-known in the art. The anode potential is selected so that when the cathode is biased to provide good launching of electrons (as in FIG. 6), the potential difference between anode and cathode is about 150 volts. The cathode and anode shields are positioned to give the correct launching fields for the electrons. Computer simulations of the potential contours and electron trajectories are useful for positioning the shields relative to the cathode and anode and for selecting cathode and anode bias voltages. The conditions for correct launching can readily be determined using known electromagnetic field theory and computer simulation of electron trajectories.

Another important feature of the invention relates to the substantial removal of the cause of soft X-rays. Soft X-rays are caused by energetic electrons impinging on the anode or other electrodes whose potential is much more positive than the potential of the cathode.

The prior art has attempted to minimize the effect of X-rays as for example in the BA gauge, U.S. Pat. No. 2,605,431, where a very small diameter ion collector is made to subtend a very small angle at the anode where soft X-rays are formed. By using a small diameter collector only a small fraction of the X-rays can affect the ion current measurement. Other prior art gauges attempt to avoid the bad effects of soft X-rays by extracting the positive ions from the ion formation volume and collecting the ions on an ion collector located in a separate volume well shielded from X-rays.

What is done in the present invention is to provide means to collect the energetic electrons at such a low electron energy after one pass through the anode volume that only very low energy X-rays are produced and the low pressure limit of the ion gauge is greatly reduced. It is very difficult to measure the yield of soft X-rays produced by a beam of electrons impinging on a solid surface. However, from energy conservation principles it is certain that the energy per X-ray photon released does not exceed the energy of the incident electron. Thus, if the energy of an electron incident on a tungsten anode is, for example, 5 eV, one can assume with certainty that the energy of the soft X-ray emitted will not exceed 5 eV.

The yield of electrons per X-ray quantum is easier to determine. This measurement is discussed in the Physical Basis of Ultra-High Vacuum by Paul Redhead, Barnes & Noble, 1968, p. 234 ff. Measurements are described showing that the number of electrons released per X-ray photon decreases from about $10^{-2}$ at an X-ray energy of 10 eV to about $10^{-9}$ at an X-ray energy of 5 eV. Thus, generation of 5 eV X-rays will cause the photo emission of electrons from the ion collector to be about $10^7$ times lower than for 10 eV X-rays. Decreasing the energy at which electrons are collected greatly decreases the soft X-ray effect.

Figure 8:
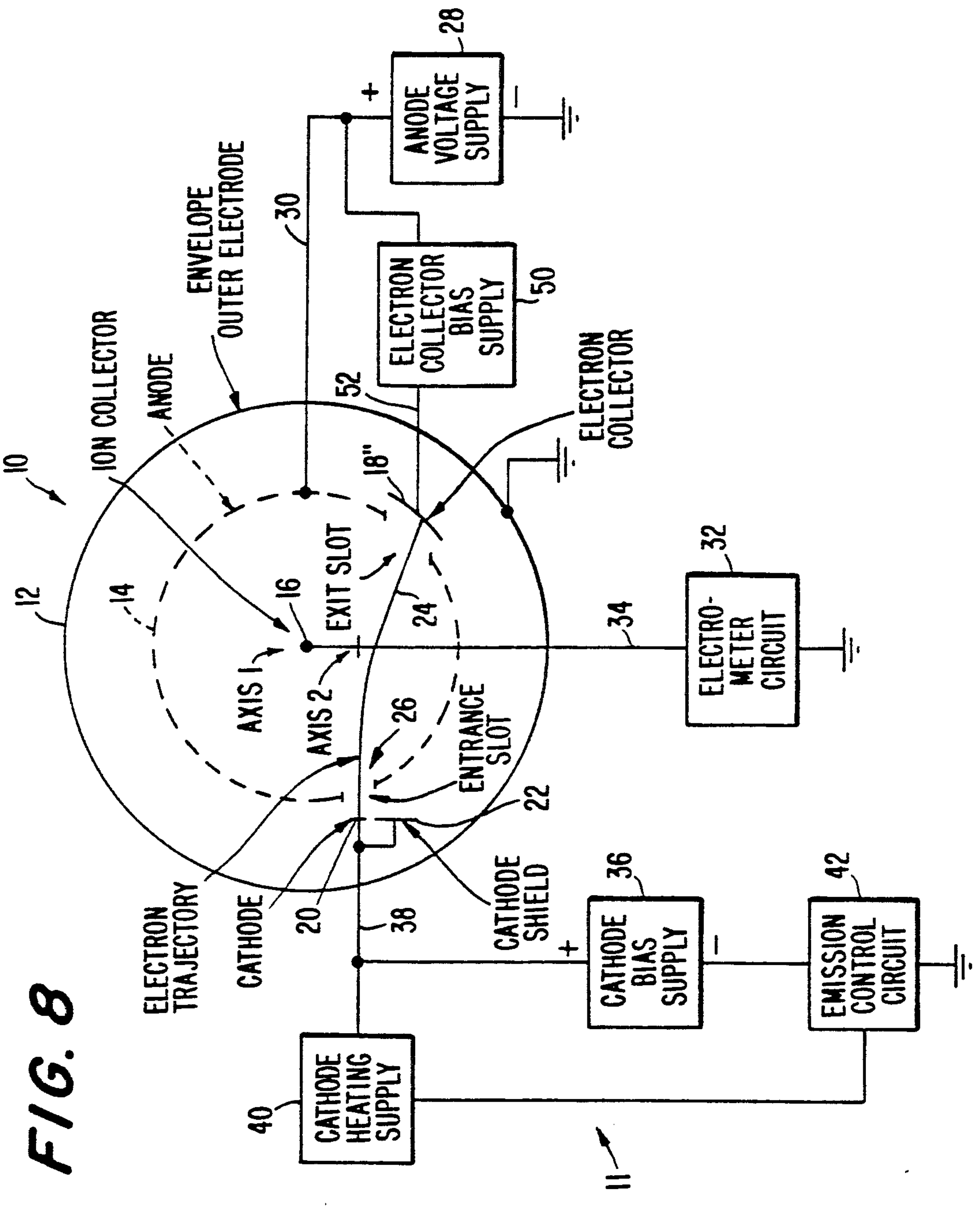
FIG. 8 is a diagrammatic cross sectional view of a modified embodiment of an improved gauge in accordance with the invention for the prevention of soft x-rays by collecting electrons at low energy on a separate electron collector.

In accordance with the invention, as illustrated in FIG. 8, means are provided to launch all electrons through a narrow exit slot 48 after one pass along the anode volume rather than collect them on the anode as described above with respect to FIG. 1. After exiting the anode volume, the energetic electrons are decelerated and collected on an electron collector electrode 18" located outside the anode volume and held a few volts positive with respect to the cathode. Thus, electrons are collected at an energy of a few electron volts rather than at over 100 electron volts. Thus, negligible soft X-rays are produced and the X-ray limit is greatly reduced.

The positive bias voltage on the electron collector 18" can be produced by a separate power supply or preferably by using the anode voltage supply 28 and an electron collector bias supply 50 including Zener diode, for example, to drop the electron collector voltage to a few volts above cathode bias voltage where supply 50 is connected to collector 18" via 52.

It should also be noted that the foregoing approach of the present invention is different from that disclosed in above-mentioned U.S. Pat. No. 4,636,680 (FIG. 5) where ionizing electrons pass through an aperture in a closed anode and are deflected to the outer surface of the anode so that the resulting x-rays do not affect the ion collector within the anode volume. As discussed hereinbefore, a closed anode may result in outgassing. Thus, the use of a separate electrode in accordance with the present invention not only permits the use of an open grid-like anode with minimal outgassing but also advantageously facilitates the collection of the electrons at low energy as discussed above, which is not effected in the U.S. Pat. No. 4,636,680 where the electrons are collected at the anode voltage at high energy.

Figure 9:
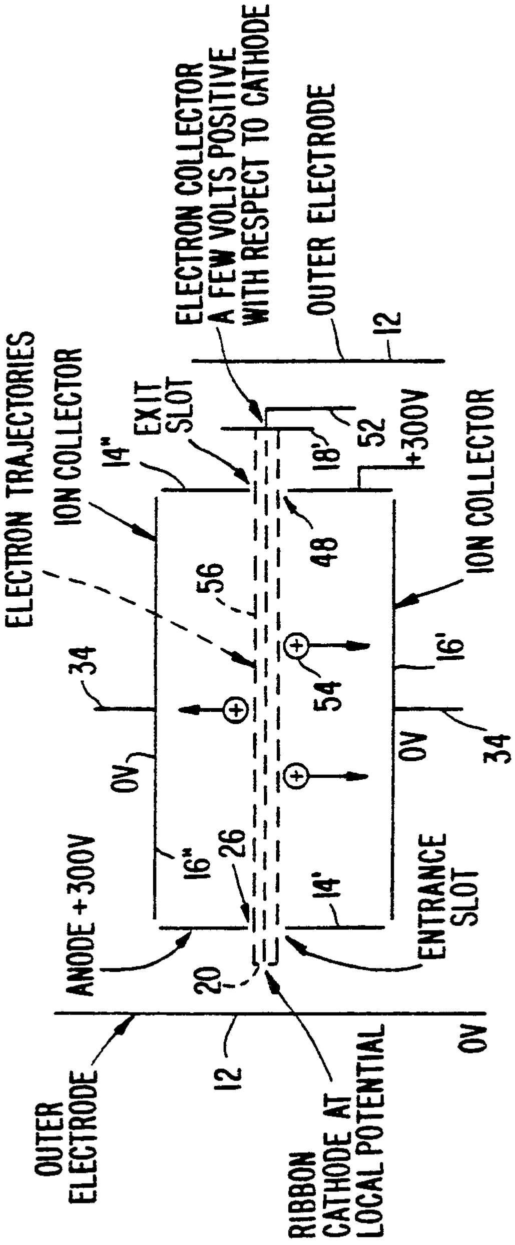
FIG. 9 is a diagrammatic cross sectional view perpendicular to the ribbon cathode of a further modified embodiment of the invention for the prevention of soft x-rays.

Other electrode arrangements are also possible wherein electrons from a cathode are launched in a beam through a region where ions are created and then extracted through a suitable aperture and caused to be collected at low energy. A suitable ion collector of large area can then be used to collect the ions thus formed. Because there are negligible soft X-rays generated, the ion collector can be of any size, shape and location without limiting the lowest pressure which can be measured. One such electrode arrangement is shown in FIG. 9 which is a cross sectional top view perpendicular to ribbon cathode 20 and which includes large area ion collectors 16′, 16″ which collect ions 54. In particular, the ribbon cathode so extends vertically with respect to the plane of FIG. 9 as do anode plates (or grids) 14′, 14″, the electron collector electrode 18′ and ion collector plates (or grids) 16′, 16″ where plates (or grids) 16′, 16″ extend in a direction substantially parallel to electron trajectories 56, as can be seen in FIG. 9. In this embodiment, the electron beam may be established in any manner including that of FIG. 1.

Another feature of the invention relates to the extension of the high pressure limit obtainable with conventional BA gauges. Thus, in accordance with the invention, soft X-ray production is limited as described above and the diameter of the ion collector is increased so that even ions with large angular momenta are collected on the first pass at the ion collector. When a small diameter collector (such as a 0.010″ diameter collector as used in the prior art) must be used to limit soft X-ray effects, then positive ions formed with large angular momenta about the ion collector cannot be collected. Thus, ion orbiting occurs and ion space charge builds up, altering the potential distribution inside the anode. Alteration of the potential distribution typically results in loss of ions to other electrodes thus limiting the high pressure that can be measured.

Because soft X-rays are not produced in the embodiment of FIG. 8, an ion collector of large diameter may be used to extend the high pressure limit without affecting the low pressure limit of the gauge. Computer simulation shows that a 0.2″ diameter ion collector will collect nitrogen ions launched tangentially with 10 eV of energy at a radius of about $\frac{1}{2}$″. The minimum useful ion collector radius is about 0.0025″ and is limited by the angular momentum of thermal energy ions. The maximum useful ion collector radius is about 25% of the radius of the anode.

Another feature of the invention relates to the extension of the high pressure limit without extracting electrons from the anode volume as in the FIGS. 8 and 9 embodiments. Thus, in accordance with this feature of the invention, the high pressure limit in BA geometry may be extended by reducing the fraction of ions created that orbit about the ion collector before being collected. In prior art BA ion gauges the ion collecting field is purposely made cylindrically symmetrical so that the smallest angular momentum about the ion collector is imparted to the ions. For example, if the ion collector in a BA gauge is placed off center, thus causing the electric field to be non-cylindrically symmetrical, a large fraction of the ions formed throughout the anode volume are initially accelerated toward the axis of the anode, and thus acquire sizable angular momentum about the displaced ion collector. The result is an increase in ion space charge due to non-collection of orbiting ions and a reduction in the maximum pressure the gauge can measure. Applicant has observed variations in sensitivity even at a pressure as low as $5\times10^{-7}$ Torr with non-cylindrically symmetrical geometries.

Figure 10:
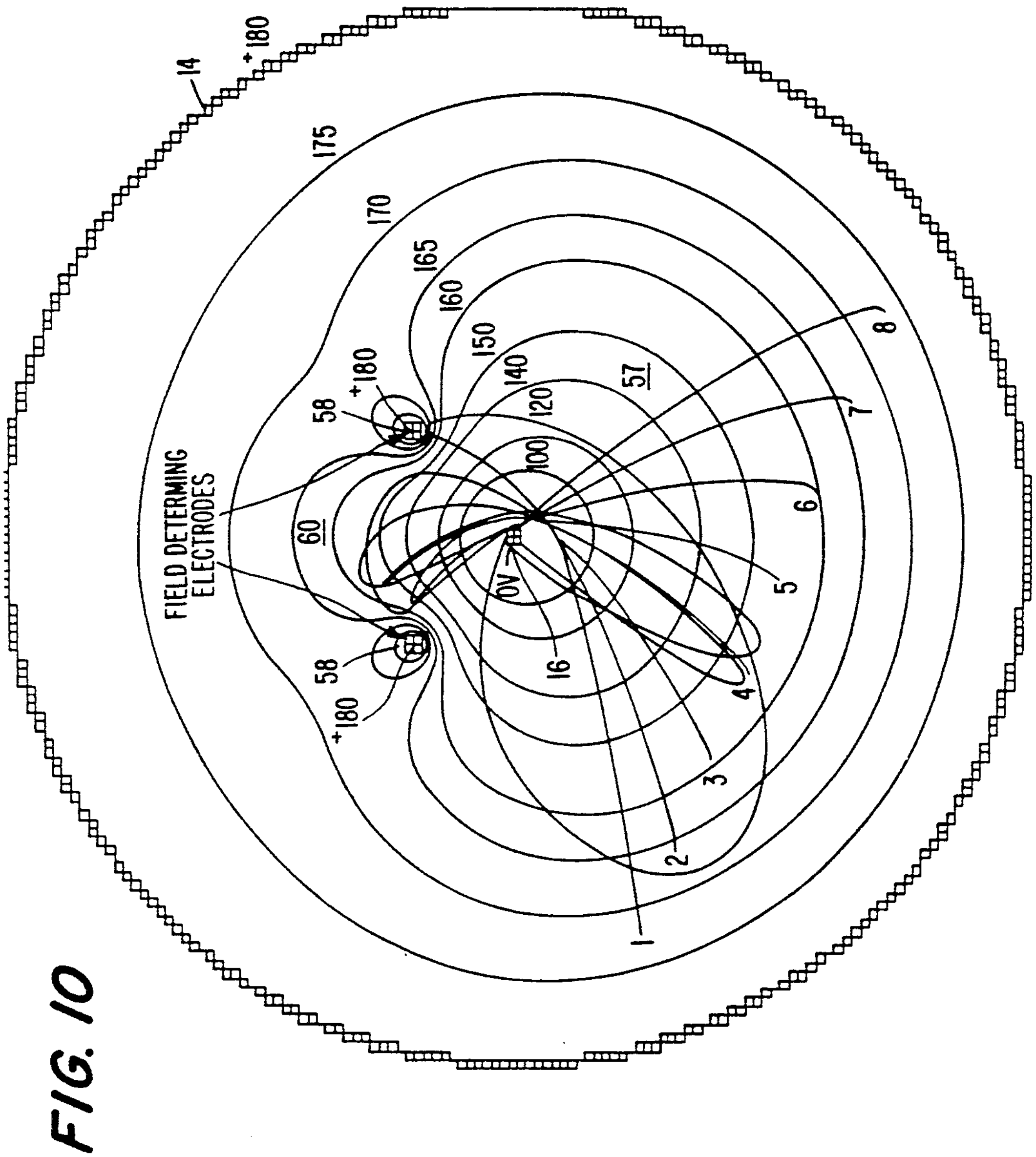
FIG. 10 is a computer simulation of a further modified embodiment of the invention where ions are created on one side of the ion collector and a pair of auxiliary electrodes are disposed on the opposite side of the ion collector to minimize ion orbiting.

Reference is made to FIG. 10, which corresponds to FIG. 6 except that only one cathode is employed rather than two so that electrons are launched only on one side (generally indicated at 57) of the ion collector 16. Thus, ions are created only in a nearly cylindrically symmetrical field at side 57. Hence, all ions are launched with the minimum angular momentum. On the other side 60 of the ion collector, one or more field deforming electrodes 58 are positioned at anode potential which serve to severely deform the cylindrically symmetrical field on side 60. Thus, ions which miss the ion collector on the first pass are funneled back toward the ion collector 16 and collected with minimal orbiting.

Figure 11:
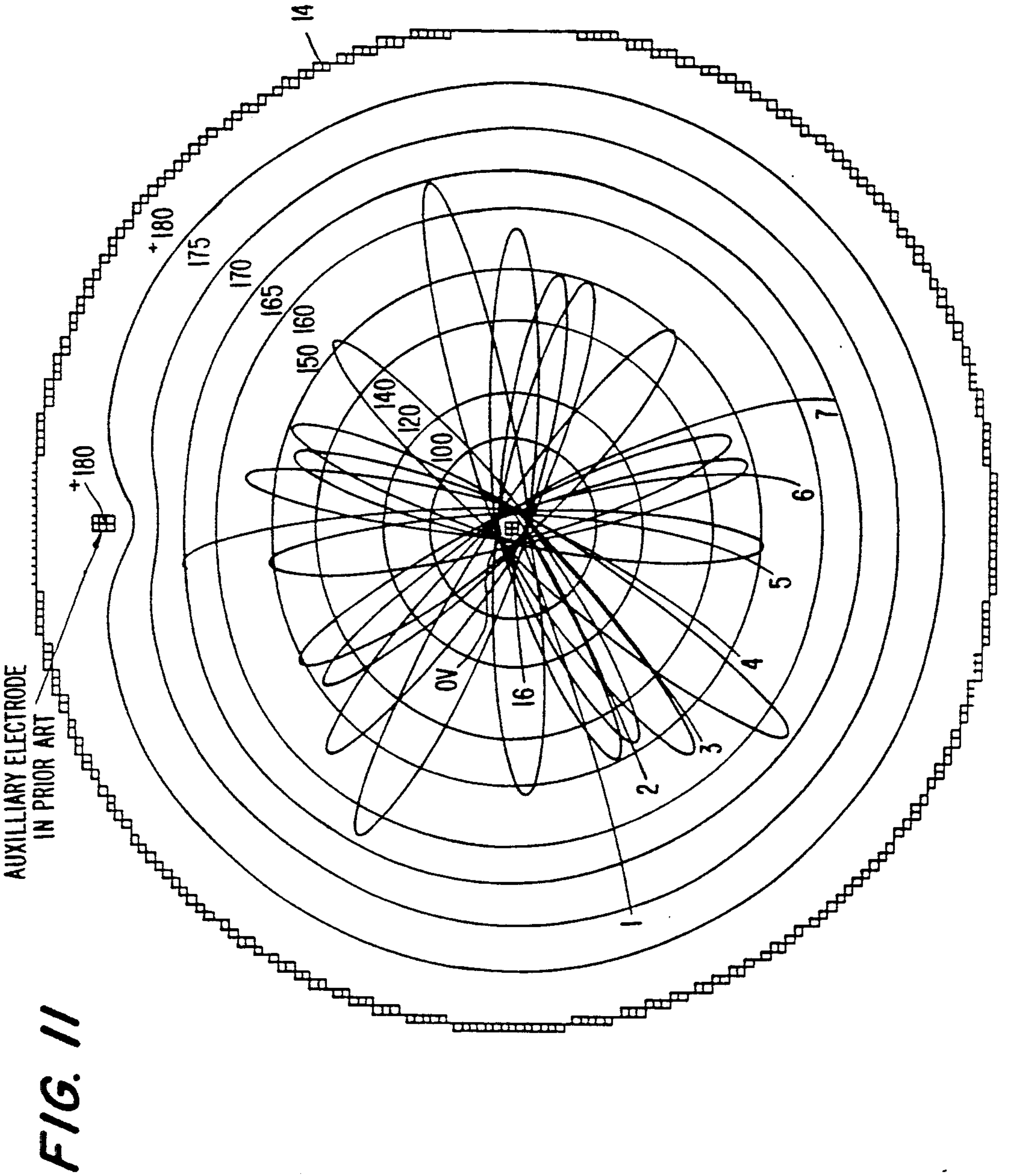
FIG. 11 is a computer simulation of an approximation of a prior art electrode arrangement which demonstrates the effectiveness of the FIG. 10 arrangement with respect to the minimization of ion orbiting.

In order for the field deforming electrodes 58 to be effective, they must be positioned so that the disturbance of the symmetrical field occurs in the region where ions orbit. Obviously, it does no good to disturb the field at large radii if the orbiting ions never transit through the disturbed field. West German Patent DE 3042.172A1 describes a wire rectangle electrode attached to the inner wall of the anode parallel to the axis of the anode and projecting radially into the anode volume a short distance. The stated purpose of this rectangular electrode is to prevent Barkhausen oscillations by electrons. However, the rectangular electrode shown extending only a short distance radially inward will have negligible effect on most orbiting ions. This effect or non-effect is shown in FIG. 11. To be effective in improving ion collection, the additional electrodes 58 must be positioned relatively close to the ion collector 16 so that the cylindrically symmetrical electric field in the region 60 traversed by ions is greatly disturbed.

What is claimed is:

1. An ion gauge comprising a cylindrical anode having an axis of cylindrical symmetry where an anode volume is defined within the anode and the anode is at least partially open to permit the passage of electrons from outside the anode into the anode volume;

an outer electrode surrounding the anode;

an ion collector substantially disposed along said axis of symmetry of the anode;

at least one cathode for emitting electrons disposed outside the anode and axially extending substantially parallel to the axis of the anode;

means for launching the emitted electrons in substantially parallel paths directed substantially toward an imaginary axis radially displaced from and substantially parallel to the anode axis; and means for collecting the electrons emitted from the cathode after they have passed through the anode volume.

2. An ion gauge as in claim 1 including at least one auxiliary electrode disposed on the side of the ion collector opposite to the side which includes the imaginary axis to reduce orbiting of ions about the ion collector.

3. An ion gauge as in claim 2 where said auxiliary electrode is biased at the potential of the anode.

4. An ion gauge comprising a cylindrical anode having an axis of cylindrical symmetry where an anode volume is defined within the anode and the anode is at least partially open to permit the passage of electrons from outside the anode into the anode volume;

an outer electrode surrounding the anode;

an ion collector substantially disposed along said axis of symmetry of the anode;

at least one cathode for emitting electrons disposed outside the anode and axially extending substantially parallel to the axis of the anode, said cathode having a substantially flat electron emitting surface which faces an imaginary axis radially displaced from and substantially parallel to the anode axis such that electrons emitted from the flat cathode surface are launched in substantially parallel paths directed substantially toward the imaginary axis; and means for collecting the electrons emitted from the cathode after they have passed through the anode volume.

5. An ion gauge as in claim 4 including at least one auxiliary electrode disposed on the side of the ion collector opposite to the side which includes the imaginary axis to reduce orbiting of ions about the ion collector.

6. An ion gauge as in claim 5 where said auxiliary electrode is biased at the potential of the anode.

7. An ion gauge as in claim 4 including launching means to facilitate the launching of the electrons in said substantially parallel paths.

8. An ion gauge comprising a cylindrical anode having an axis of cylindrical symmetry where an anode volume is defined within the anode and the anode is at least partially open to permit the passage of electrons from outside the anode into the anode volume;

an outer electrode surrounding the anode;

an ion collector substantially disposed along an imaginary axis radially displaced from and substantially parallel to said axis of symmetry of the anode;

at least one cathode for emitting electrons disposed outside the anode and axially extending substantially parallel to the axis of the anode;

means for launching the emitted electrons in substantially parallel paths directed substantially toward the axis of symmetry of the anode; and means for collecting the electrons emitted from the cathode after they have passed through the anode volume.

9. An ion gauge comprising a cylindrical anode having an axis of cylindrical symmetry where an anode volume is defined within the anode and the anode is at least partially open to permit the passage of electrons from outside the anode into the anode volume:

an outer electrode surrounding the anode;

an ion collector substantially disposed along an imaginary axis radially displaced from and substantially parallel to said axis of symmetry of the anode;

at least one cathode for emitting electrons disposed outside the anode and axially extending substantially parallel to the axis of the anode, said cathode having a substantially flat electron emitting surface which faces the axis of symmetry of the anode such that electrons emitted from the flat cathode surface are launched in substantially parallel paths directed substantially toward the axis of symmetry of the anode; and means for collecting the electrons emitted from the cathode after they have passed through the anode volume.

10. An ion gauge as in claim 9 including launching means to facilitate the launching of the electrons in said substantially parallel paths.

11. An ion gauge as in claims 1, 4, 8, or 9 where said anode comprises an open grid which defines an open anode volume.

12. An ion gauge as in claim 11 where said electrode collecting means comprises a solid strip disposed on and connected to the anode.

13. An ion gauge as in claims 1, 4, 8, or 9 where said anode is solid and said anode volume is substantially closed.

14. An ion gauge as in claims 1, 4, 8, or 9 where said anode includes a slot through which electrons emitted from the cathode pass into the anode volume.

15. An ion gauge as in claims 1, 7, 8, or 10 where said launching means launches all of the electrons emitted by the cathode through the slot.

16. An ion gauge as in claims 1, 7, 8, or 10 where said launching means so launches the electrons that they are all collected by the electron collecting means after only one pass through the anode volume.

17. An ion gauge as in claims 1, 7, 8 or 10 where said launching means includes at least one shield electrode spaced from and substantially parallel to the cathode.

18. An ion gauge as in claim 17 where said shield electrode is electrically connected to the cathode.

19. An ion gauge as in claim 18 where said launching means includes at least one further shield electrode disposed adjacent the anode and substantially parallel to the cathode.

20. An ion gauge as in claim 19 where said further shield electrode is electrically connected to the anode.

21. An ion gauge as in claims 1, 7, 8, or 10 where said launching means includes two shield electrodes spaced on opposite sides from and substantially parallel to the cathode.

22. An ion gauge as in claim 21 where said shield electrodes are electrically connected to the cathode.

23. An ion gauge as in claims 1, 7, 8, or 10 where said launching means includes at least one shield electrode disposed adjacent to and electrically connected to the anode and substantially parallel to the cathode.

24. An ion gauge as in claims 1, 4, 8 or 9 where said cathode is positioned approximately midway between the outer electrode and the anode.

25. An ion gauge as in claims 4 or 9 where the anode is of the open grid type and the width of the cathode is not more than 40% of the radius of the anode.

26. An ion gauge as in claims 4 or 9 where the width of the cathode is not more than 20% of the anode radius.

27. An ion gauge as in claim 26 where said cathode width is not more than 5% of the anode radius.

28. An ion gauge as in claims 1, 4, 8, or 9 where said cathode is biased at the approximate local potential prevailing in the region of the cathode.

29. An ion gauge as in claim 28 where said cathode is spaced from and inclined with respect to the anode so that substantially all portions of the cathode are at said local potential when the cathode is heated by a direct current.

30. An ion gauge as in claims 1, 4, 8, or 9 including two cathodes.

31. An ion gauge as in claims 1, 4, 8, or 9 where said anode includes at least one exit opening through which the electrons exit from the anode volume and where said electron collecting means is an electrode spaced from said anode and in the path of the electrons exiting from the anode volume.

32. An ion gauge as in claim 31 where said electron collecting means is so biased that the electrons are collected at substantially lower energy than if they were collected at the anode.

33. An ion gauge as in claim 32 where said electron collecting electrode is positively biased with respect to the cathode.

34. An ion gauge as in claim 33 where the electron collecting electrode is biased a few volts positive with respect to the cathode.

35. An ion gauge as in claims 1, 4, 8, or 9 where said ion collector has a radius in the range of 0.0025 inch up to 25% of the radius of the anode.

36. Controller circuitry for controlling the operation of an ion gauge including a substantially cylindrical anode, an outer electrode surrounding the anode, an ion collector, and a cathode for emitting electrons into an anode volume defined within the anode, said circuitry comprising:

means for biasing the cathode at the approximate local potential prevailing in the region of the cathode; and means for biasing the anode at a potential sufficient to accelerate the emitted electrons to an effective energy for causing ionization of a gas in the anode volume.

37. Circuitry as in claim 36 including means for supplying a direct current to the cathode.

38. Circuitry as in claim 36 where said gauge is a Bayard-Alpert gauge.

39. Circuitry as in claim 36 where said ion gauge includes an electron collector electrode separate from the anode and said circuitry includes means for biasing the electron collector electrode so that the electrons emitted by the cathode are collected at substantially lower energy than if they were collected at the anode.

40. Circuitry as in claim 36 where said ion collector is substantially disposed along the axis of symmetry of the anode and the cathode is disposed outside the anode and axially extends substantially parallel to the axis of the anode and where the ion gauge includes means for launching the emitted electrons in substantially parallel paths directed substantially toward an imaginary axis radially displaced from and substantially parallel to the anode axis.

41. Circuitry as in claim 36 where said ion collector is substantially disposed along the axis of symmetry of the anode, the cathode is disposed outside the anode and axially extends substantially parallel to the axis of the anode for emitting electrons through the anode, said cathode having a substantially flat electron emitting surface which faces an imaginary axis radially displaced from and substantially parallel to the anode axis such that electrons emitted from the flat cathode surface are launched in substantially parallel paths directed substantially toward the imaginary axis.

42. Circuitry as in claims 40 or 41 including at least one auxiliary electrode disposed on the side of the ion collector opposite to the side which includes the imaginary axis to reduce orbiting of ions about the ion collector.

43. Circuitry as in claim 42 including means for biasing said auxiliary electrode approximately at the potential of the anode.

44. Circuitry as in claim 41 including launching means to facilitate the launching of the electrons in said substantially parallel paths.

45. Circuitry as in claim 36 where said ion collector is substantially disposed along an imaginary axis radially spaced from and substantially parallel to said axis of symmetry of the anode and the cathode is disposed outside the anode and axially extending substantially parallel to the axis of the anode and where the ion gauge includes means for launching the emitted electrons in substantially parallel paths directed substantially toward the axis of symmetry of the anode.

46. Circuitry as in claim 36 where said ion collector is substantially disposed along an imaginary axis radially spaced from and substantially parallel to said axis of symmetry of the anode, the cathode is disposed outside the anode and axially extending substantially parallel to the axis of the anode for emitting electrons through the anode, said cathode having a substantially flat electron emitting surface which faces the axis of symmetry of the anode such that electrons emitted from the flat cathode surface are launched in substantially parallel paths directed substantially toward the anode axis of symmetry.

47. An ion gauge as in claim 46 including launching means to facilitate the launching of the electrons in said substantially parallel paths.

48. Circuitry as in claims 40, 41, 45, or 46 where said anode comprises an open grid which defines an open anode volume.

49. Circuitry as in claim 48 where said electrode collecting means comprises a solid strip disposed on and connected to the anode.

50. Circuitry as in claims 40, 41, 45, or 46 where said anode is solid and said anode volume is substantially closed.

51. Circuitry as in claims 40, 41, 45, or 46 where said anode includes a slot through which electrons emitted from the cathode pass into the anode volume.

52. Circuitry as in claims 40, 44, 45, or 47 where said launching means launches all of the electrons emitted by the cathode through the slot.

53. Circuitry as in claims 40, 44, 45, or 47 where said launching means so launches the electrons that they are all collected by the electron collecting means after only one pass through the anode volume.

54. Circuitry as in claims 40, 44, 45, or 47 where said launching means includes at least one shield electrode spaced from and substantially parallel to the cathode.

55. Circuitry as in claim 54 where said shield electrode is electrically connected to the cathode.

56. Circuitry as in claim 55 where said launching means includes at least one further shield electrode disposed adjacent the anode and substantially parallel to the flat electron emitting surface of the cathode.

57. Circuitry as in claim 56 where said further shield electrode is electrically connected to the anode.

58. Circuitry as in claims 40, 44, 45, or 47 where said launching means includes two shield electrodes spaced on opposite sides from and substantially parallel to the cathode.

59. Circuitry as in claim 58 where said shield electrodes are electrically connected to the cathode.

60. Circuitry as in claims 40, 44, 45, or 47 where said launching means includes at least one further shield electrode disposed adjacent to and electrically connected to the anode and substantially parallel to the cathode.

61. Circuitry as in claims 40, 41, 45, or 46 where said cathode is biased at the approximate local potential prevailing in the region of the cathode.

62. Circuitry as in claim 61 where said cathode is spaced from and inclined with respect to the anode so that substantially all portions of the cathode are at said local potential when the cathode is heated by a direct current.

63. Circuitry as in claims 40, 41, 45, or 46 where said cathode is positioned approximately midway between the outer electrode and the anode.

64. Circuitry as in claims 41 or 46 where the anode is of the open grid type and the width of the cathode is not more than 40% of the radius of the anode.

65. Circuitry as in claims 41 or 46 where the width of the cathode is not more than 20% of the anode radius.

66. Circuitry as in claim 65 where said cathode width is not more than 5% of the anode radius.

67. Circuitry as in claims 40, 41, 45, or 46 including two cathodes.

68. Circuitry as in claims 40, 41, 45, or 46 where said anode includes at least one exit opening through which the electrons exit from the anode volume and where said electron collecting means is an electrode spaced from said anode and in the path of the electrons exiting from the anode volume.

69. Circuitry as in claim 68 where said circuitry includes means for biasing said electron collecting means so that the electrons are collected at substantially lower energy than if they were collected at the anode.

70. Circuitry as in claim 69 where said electron collecting electrode is positively biased with respect to the cathode.

71. Circuitry as in claim 70 where the electron collecting electrode is biased a few volts positive with respect to the cathode.

72. Circuitry as in claims 40, 41, 45, or 46 where said ion collector has a radius in the range of 0.0025 inch up to 25% of the radius of the anode.

73. Controller circuitry for controlling the operation of an ion gauge including an anode where an anode volume is defined by the anode and the anode is at least partially open to permit the passage of electrons from outside the anode into the anode volume and where the anode includes an exit aperture through which the electrons exit from the anode volume; an outer electrode surrounding the anode; at least one ion collector; at least one cathode disposed outside the anode for emitting electrons through the anode into the anode volume; and an electron collecting electrode spaced separate from the anode for collecting the electrons exiting from the anode volume through the exit aperture, said circuitry comprising means for providing a bias voltage between the cathode and anode sufficient to accelerate the emitted electrons to an effective energy for causing ionization of a gas in the anode volume; and means for biasing said electron collecting electrode so that the electrons are collected at substantially lower energy than if they were collected at the anode.

74. An ion gauge as in claim 73 where said anode is cylindrical and has an axis of cylindrical symmetry where an anode volume is defined within the anode and the anode is at least partially open to permit the passage of electrons from outside the anode into the anode volume, said ion collector being substantially disposed along said axis of symmetry of the anode, and said cathode axially extending substantially parallel to the axis of the anode and where the ion gauge includes means for launching the emitted electrons in substantially parallel paths directed substantially toward an imaginary axis radially displaced from and substantially parallel to the anode axis.

75. An ion gauge as in claim 73 where said anode is cylindrical and has an axis of cylindrical symmetry where an anode volume is defined within the anode and the anode is at least partially open to permit the passage of electrons from outside the anode into the anode volume, said ion collector being substantially disposed along said axis of symmetry of the anode, and said cathode axially extending substantially parallel to the axis of the anode, said cathode having a substantially flat electron emitting surface which faces an imaginary axis radially displaced from and substantially parallel to the anode axis such that electrons emitted from the flat cathode surface are launched in substantially parallel paths directed substantially toward the imaginary axis.

76. An ion gauge as in claim 73 where said anode is an open grid, cylindrical anode having an axis of cylindrical symmetry where an anode volume is defined within the anode and the anode is at least partially open to permit the passage of electrons from outside the anode into the anode volume, said ion collector being substantially disposed along an imaginary axis radially spaced from and substantially parallel to said axis of symmetry of the anode, and said cathode axially extending substantially parallel to the axis of the anode and where the ion gauge includes means for launching the emitted electrons in substantially parallel paths directed substantially toward the axis of symmetry of the anode.

77. An ion gauge as in claim 73 where said anode is an open grid, cylindrical anode having an axis of cylindrical symmetry where an anode volume is defined within the anode and the anode is at least partially open to permit the passage of electrons from outside the anode into the anode volume, said ion collector being substantially disposed along an imaginary axis radially spaced from and substantially parallel to said axis of symmetry of the anode, and said cathode axially extending substantially parallel to the axis of the anode, said cathode having a substantially flat electron emitting surface which faces the axis of symmetry of the anode such that electrons emitted from the flat cathode surface are launched in substantially parallel paths directed substantially toward the anode axis of symmetry.

78. An ion gauge as in claim 73 where said anode includes a first member which is at least partially open to permit the passage of electrons from outside the anode into the anode volume and a second member which includes said exit aperture.

79. An ion gauge as in claim 78 where said ion collector comprises at least one plate which extends in a direction parallel to a path of the electrons extending from the opening in the first member through the anode volume to the exit aperture in the second member.

80. Circuitry as in claim 73 where said electron collecting electrode is positively biased with respect to the cathode.

81. Circuitry as in claim 80 where the electron collecting electrode is biased a few volts positive with respect to the cathode.

82. A pressure measuring method utilizing an ion gauge having a cylindrical anode having an axis of cylindrical symmetry where an anode volume is defined within the anode and the anode is at least partially open to permit the passage of electrons from outside the anode into the anode volume; an outer electrode surrounding the anode; an ion collector substantially disposed along said axis of symmetry of the anode; and at least one cathode for emitting electrons disposed outside the anode and axially extending substantially parallel to the axis of the anode; and means responsive to current in the ion collector for measuring said pressure; said method comprising the steps of:

launching the emitted electrons in substantially parallel paths directed substantially toward an imaginary axis radially displaced from and substantially parallel to the anode axis; and collecting the electrons emitted from the cathode after they have passed through the anode volume.

83. A method as in claim 82 where the gauge includes at least one auxiliary electrode disposed on the side of the ion collector opposite to the side which includes the imaginary axis and whereby the method includes the step of reducing orbiting of ions about the ion collector by biasing said auxiliary electrode at the potential of the anode.

84. A pressure measuring method utilizing an ion gauge having a cylindrical anode having an axis of cylindrical symmetry where an anode volume is defined within the anode and the anode is at least partially open to permit the passage of electrons from outside the anode into the anode volume; an outer electrode surrounding the anode; an ion collector substantially disposed along an imaginary axis radially displaced from and substantially parallel to said axis of symmetry of the anode; at least one cathode for emitting electrons disposed outside the anode and axially extending substantially parallel to the axis of the anode; and means responsive to current in the ion collector for measuring said pressure; said method comprising the steps of:

launching the emitted electrons in substantially parallel paths directed substantially toward an axis of symmetry of the anode; and collecting the electrons emitted from the cathode after they have passed through the anode volume.

85. A method as in claims 82 or 84 including biasing said cathode at the approximate local potential prevailing in the region of the cathode.

86. A method as in claim 82 or 84 where said anode includes at least one exit opening through which the electrons exit from the anode volume and where said electron collecting means is an electrode spaced from said anode and in the path of the electrons exiting from the anode volume, said method including biasing said electron collecting means so that the electrons are collected at substantially lower energy than if they were collected at the anode.

87. A method as in claim 86 including biasing said electron collecting electrode positively with respect to the cathode.

88. A method as in claim 87 including biasing the electron collecting electrode a few volts positive with respect to the cathode.

89. A pressure measuring method for use with controller circuitry for measuring said pressure by controlling the operation of an ion gauge including a substantially cylindrical anode, an outer electrode surrounding the anode, an ion collector, and a cathode for emitting electrons into an anode volume defined within the anode, said method comprising the steps of:

biasing the cathode at the approximate local potential prevailing in the region of the cathode; and biasing the anode at a potential sufficient to accelerate the emitted electrons to an effective energy for causing ionization of a gas in the anode volume.

90. A method as in claim 89 including supplying a direct current to the cathode.

91. A method as in claim 89 where said ion gauge includes an electrode collector electrode separate from the anode and said method includes biasing the electron collector electrode so that electrons emitted by the cathode are collected at substantially lower energy than if they were collected at the anode.

92. A method as in claim 89 where said ion collector is substantially disposed along the axis of symmetry of the anode and the cathode is disposed outside the anode and axially extends substantially parallel to the axis of the anode and where the method includes the steps of launching the emitted electrons in substantially parallel paths directed substantially toward an imaginary axis radially displaced from and substantially parallel to the anode axis and collecting the electrons emitted from the cathode after they have passed through the anode volume.

93. A method as in claim 92 where the gauge includes at least one auxiliary electrode disposed on the side of the ion collector opposite to the side which includes the imaginary axis and where said method includes reducing orbiting of ions about the ion collector by biasing said auxiliary electrode approximately at the potential of the anode.

94. A method as in claim 89 where said ion collector is substantially disposed along an imaginary axis radially spaced from and substantially parallel to said axis of symmetry of the anode and the cathode is disposed outside the anode and axially extending substantially parallel to the axis of the anode and where the method includes the step of launching the emitted electrons in substantially parallel paths directed substantially toward the axis of symmetry of the anode and collecting the electrons emitted from the cathode after they have passed through the anode volume.

95. A method as in claim 92 or 94 including biasing said cathode at the approximate local potential prevailing in the region of the cathode.

96. A method as in claim 92 or 94 where said anode includes at least one exit opening through which the electrons exit from the anode volume and where said electron collecting means is an electrode spaced from said anode and in the path of the electrons exiting from the anode volume and where the method includes the step of biasing said electron collecting means so that the electrons are collected at substantially lower energy than if they were collected at the anode.

97. A method as in claim 96 including biasing said electron collecting electrode positively with respect to the cathode.

98. A method as in claim 97 including biasing the electron collecting electrode a few volts positive with respect to the cathode.

99. A pressure measuring method utilizing an ion gauge having an anode where an anode volume is defined by the anode and the anode is at least partially open to permit the passage of electrons from outside the anode into the anode volume and where the anode includes an exit aperture through which the electrons exit from the anode volume; an outer electrode surrounding the anode; at least one ion collector; at least one cathode disposed outside the anode for emitting electrons through the anode into the anode volume; and an electron collecting electrode separate from the anode for collecting the electrons exiting from the anode volume through the exit aperture, and means responsive to current in the ion collector for measuring said pressure: said method comprising:

biasing said electron collecting means so that the electrons are collected at substantially lower energy than if they were collected at the anode.

100. A method as in claim 99 including biasing said electron collecting electrode positively with respect to the cathode.

101. A method as in claim 100 including biasing the electron collecting electrode a few volts positive with respect to the cathode.

* * * * *